United States Patent [19]
Chandalia et al.

[11] Patent Number: 5,506,328
[45] Date of Patent: *Apr. 9, 1996

[54] LOW VOC, MOISTURE CURABLE, TWO-COMPONENT COATING COMPOSITIONS BASED ON ORGANIC POLYISOCYANATES

[75] Inventors: Kiran B. Chandalia, Cheshire; Michael J. Morgan, Torrington; James M. O'Connor, Branford; Stephen L. Goldstein, Cheshire, all of Conn.

[73] Assignee: Olin Corporation, Cheshire, Conn.

[*] Notice: The term of this patent shall not extend beyond the expiration date of Pat. No. 5,360,642.

[21] Appl. No.: 64,996

[22] Filed: May 24, 1993

[51] Int. Cl.⁶ .......................... C08G 18/18; C08G 18/30; C08K 5/00; B05D 3/04
[52] U.S. Cl. .......................... 528/49; 427/385.5; 524/315; 524/317; 524/361; 524/484; 524/589; 524/590; 524/759; 524/770; 524/773; 524/871; 524/874; 524/875; 528/48; 528/53; 528/59; 528/65; 528/73; 528/76; 528/80; 528/85
[58] Field of Search .................. 528/48, 49, 53, 528/59, 73, 76, 80, 65, 85; 427/385.5; 524/315, 317, 361, 484, 589, 590, 770, 773, 871, 874, 875, 759

[56] References Cited

U.S. PATENT DOCUMENTS

| | | | |
|---|---|---|---|
| 3,350,361 | 10/1967 | Chandley et al. | 528/77 |
| 3,425,973 | 2/1969 | Shaw, Jr. | 524/590 |
| 3,912,691 | 10/1975 | Emmons | 528/73 |
| 3,919,173 | 11/1975 | Coyner et al. | 528/55 |
| 4,024,117 | 5/1977 | Emmons | 528/73 |
| 4,032,686 | 6/1977 | Emmons | 528/59 |
| 4,038,239 | 7/1977 | Coyner et al. | 528/58 |
| 4,322,327 | 3/1982 | Yoshimura et al. | 528/49 |
| 4,355,138 | 10/1982 | Markusch et al. | 525/127 |
| 4,397,707 | 8/1983 | Dawdy | 528/58 |
| 4,400,498 | 8/1983 | Konishi et al. | 528/60 |
| 4,413,111 | 11/1983 | Markusch et al. | 528/59 |
| 4,436,784 | 3/1984 | Ehrhart | 428/423.1 |
| 4,456,658 | 6/1984 | Kubitza et al. | 528/59 |
| 4,469,831 | 9/1984 | Bueltjer et al. | 528/49 |
| 4,560,494 | 12/1985 | Druetzler | 528/73 |
| 4,618,651 | 10/1986 | Gilch et al. | 525/130 |
| 4,661,542 | 4/1987 | Gilch et al. | 528/49 |
| 4,710,560 | 12/1987 | Vu | 528/76 |
| 4,820,368 | 4/1989 | Markevka et al. | 525/111 |
| 4,853,454 | 8/1989 | Merger et al. | 528/59 |
| 4,983,676 | 1/1991 | Petrie et al. | 525/107 |
| 5,081,203 | 1/1992 | Pedain et al. | 528/49 |
| 5,126,421 | 6/1992 | Majewski et al. | 528/49 |
| 5,128,423 | 7/1992 | Parrinello et al. | 528/28 |
| 5,144,031 | 9/1992 | Pedain | 544/193 |
| 5,206,331 | 4/1993 | Tsuno et al. | 528/49 |
| 5,243,011 | 9/1993 | Panandiker et al. | 528/45 |
| 5,290,853 | 3/1994 | Regan et al. | 528/76 |
| 5,360,642 | 11/1994 | Chandalia et al. | 528/75 |
| 5,369,207 | 11/1994 | Wolff et al. | 528/49 |
| 5,370,908 | 12/1994 | O'Connor et al. | 528/73 |
| 5,391,614 | 2/1995 | Chandalia et al. | 528/59 |

*Primary Examiner*—James J. Seidleck
*Assistant Examiner*—Rabon A. Sergent
*Attorney, Agent, or Firm*—Dale L. Carlson

[57] ABSTRACT

This invention relates to a process for coating a substrate comprising contacting the substrate with a low volatile organics, moisture curable, two-component coating composition comprising an admixture of an A-side and a B-side, said A-side comprising an aliphatic polyisocyanate having an isocyanate index relative to the number of isocyanate-reactive groups in said coating composition of at least about 200, preferably at least about 300, more preferably at least about 500, said B-side comprising a tertiary amine catalyst and optionally an isocyanate-reactive compound selected from the group consisting of monoahls, polyols, imines, oxazolidines, and combinations thereof, said coating composition optionally containing a solvent in an amount of less than about 45%, based upon the weight of the polyisocyanate in said coating composition, said coating composition having a viscosity as measured by ZAHN cup 2 of less than about 200 seconds, said composition being essentially free of any volatile mono- and di-isocyanates, and said composition being moisture curable upon exposure to atmospheric moisture. Also claimed is the coating composition itself.

16 Claims, No Drawings

LOW VOC, MOISTURE CURABLE, TWO-COMPONENT COATING COMPOSITIONS BASED ON ORGANIC POLYISOCYANATES

FIELD OF THE INVENTION

This invention relates generally to moisture-curable coating compositions, and, more specifically to a process for coating substrates with a low volatile organic (so-called "low VOC") two-component coating composition which is suitably hardened under the influence of atmospheric moisture.

BACKGROUND OF THE INVENTION

One-component and two-component, moisture-curable, isocyanate-based coating formulations are well-known and are widely used. Generally, the one-component compositions are based on isocyanate-terminated prepolymers and have a viscosity sufficiently high as to make application to substrates, especially by such techniques as spraying, readily achievable only by dilution with a solvent or solvent mixture to solids levels of 50% or less. The two-component isocyanate-based coating compositions generally require less solvent than one-component isocyanate-based coating compositions, but still suffer from a high solvent demand by acrylic polyester polyols typically used in these coating compositions in order to achieve a suitable application viscosity. However, due at least in part to the introduction of the Clean Air Act of 1970, coatings formulators are under pressure to reduce volatile organic compounds ("VOC"), which translates to the solvent demand of the coating composition, to as low a level as technological advances will allow. Previous attempts to reduce the amount of acrylic polyester polyol, and hence the solvent demand, have led to a loss in the desired properties of the coating. Therefore, it would be highly desirable to provide new coating compositions, which are inherently low in viscosity and contain minimal or no solvent, but which exhibit excellent properties associated with moisture-curable, isocyanate-based coatings.

U.S. Pat. No. 5,144,031 discloses both heat-crosslinkable, one-component blocked-isocyanate compositions and two-component coating compositions which are said to harden at room temperature or at a slightly elevated temperature. Column 7, lines 46–52 of the '031 patent discloses the preparation of two-component coating compositions containing (a) a polyisocyanate prepolymer containing monohydric alcohol-containing ester groups incorporated therein and (b) an isocyanate-reactive polyhydroxyl compound. The ratio of NCO groups on the polyisocyanate to isocyanate-reactive groups is disclosed at column 8, lines 13–17 of the '031 patent calculated as being between 0.33 to 1.25 per isocyanate-reactive group.

As yet another illustration, U.S. Pat. No. 4,355,138 discloses the modification of polyisocyanates having an average functionality of greater than about 2.0 in order to make them compatible with apolar solvents, with the disclosed end use being reaction with alkyd resins for auto refinishing. The modifications are made by reacting a polyisocyanate having only aliphatically or cycloaliphatically bound isocyanate groups with (a) a compatibility modifier which is an aliphatic or cycloaliphatic monohydroxy alcohol having at least 8 carbon atoms and (b) a solubility modifier which is a monohydroxy compound containing one or more polarity inducing groups comprising a member selected from the group consisting of ester groups, ether groups, aromatic rings or mixtures thereof. In a preferred embodiment of the invention of the '138 patent, the solubility modifier and the compatibility modifier are combined into one adduct for reaction with a biuret-containing polyisocyanate.

Unfortuantely, the VOC level of the compositions of the '487 and '031 patents is not as low as might be desired, and the disclosure of the '138 patent is limited to providing enhanced compatibility and solubility in apolar solvents. Accordingly, new, lower VOC compositions which do not employ the prepolymer intermediate of the '031 patent or the polyurethane intermediate of the '487 patent, and which instead employs simpler formulations, exhibiting utility in the presence or absence of a wide variety of solvents, would be highly desired by the two-component coatings community. The present invention provides one such simplified composition.

SUMMARY OF THE INVENTION

In one aspect, the present invention relates to a process for coating a substrate comprising contacting the substrate with a low volatile organics, moisture curable, two-component coating composition comprising an admixture of an A-side and a B-side, said A-side comprising an aliphatic polyisocyanate having an isocyanate index relative to the number of isocyanate-reactive groups in said coating composition of at least about 200, preferably at least about 300, more preferably at least about 500, said B-side comprising a tertiary amine catalyst and optionally an isocyanate-reactive compound selected from the group consisting of monoahls, polyols, imines (such as ketimines and aldimines), oxazolidines, and combinations thereof, said coating composition containing a solvent in an amount of between 0% and about 45% (preferably between 0% and about 35%, most preferably between 0% and about 30%) by weight, based upon the weight of the polyisocyanate in said coating composition, said coating composition having a viscosity as measured by ZAHN cup 2 of less than about 200 seconds (preferably between about 10 seconds and about 150 seconds), said composition being essentially free of any volatile mono- and di-isocyanates, and said composition being moisture curable upon exposure to atmospheric moisture.

In another aspect, the present invention relates to a low volatile organics, moisture curable, two-component coating composition comprising an admixture of an A-side and a B-side, said A-side comprising an aliphatic polyisocyanate having an isocyanate index relative to the number of isocyanate-reactive groups in said coating composition of at least about 200, preferably at least about 300, more preferably at least about 500, said B-side comprising a tertiary amine catalyst and optionally an isocyanate-reactive compound selected from the group consisting of monoahls, polyols, imines (such as kerimines and aldimines), oxazolidines, and combinations thereof, said coating composition optionally containing a solvent in an amount of between 0% and about 45% (preferably between 0% and about 35%, most preferably between 0% and about 30%) by weight, based upon the weight of the polyisocyanate in said coating composition, said coating composition having a viscosity as measured by ZAHN cup 2 of less than about 200 seconds (preferably between about 10 seconds and about 150 seconds), said composition being essentially free of any volatile mono- and di-isocyanates, and said composition being moisture curable upon exposure to atmospheric moisture.

These and other aspects will become apparent upon reading the following detailed description of the invention.

DETAILED DESCRIPTION OF THE INVENTION

The present invention provides a so-called "two-component" coating composition that has a very low VOC and is useful for coating a wide variety of substrates. The coating composition consists essentially of a polyisocyanate, a tertiary amine catalyst to facilitate moisture cure of the composition, and an optional solvent, together with an optional isocyanate-reactive compound selected from the group consisting of monoahls, polyols, imines (such as ketimines and aldimines), oxazolidines, and combinations thereof.

The viscosity of the coating compositions is measured by the ZAHN cup 2 test. This test is performed in accordance with ASTM D4212-88. Briefly, the ZAHN cup 2 test is performed by dipping a measured cup having a bottom hole into the test composition, followed by removal of the cup and measurement of the amount of time in seconds until a break occurs in the flow stream of test composition passing through the bottom hole. For purposes of comparison, the viscosities as measured by Zahn cup No. 2 can be converted to approximate kinematic viscosities, if desired, by a computation using the following equation:

$$\text{viscosity (in centistokes)} = 2.93(t) - 500/(t)$$

where t is the viscosity in seconds as measured by the Zahn cup No. 2 test regimen.

The polyisocyanates useful in the process of the present invention are those containing one or more of the following: biuret groups, isocyanurate groups (such as cyclotrimerized isocyanurate groups), uretidione groups, urethane groups, allophanate groups, and combinations thereof. The polyisocyanate suitably has an average functionality of at least 2, preferably between 2.5 and 6, most preferably between 3 and 6. Suitable polyisocyanates include aliphatic polyisocyanates, aromatic polyisocyanates, and combinations thereof, but preferably at least some amount of an aliphatic polyisocyanate is employed in the process of the present invention. Polyisocyanates containing aliphatically and/or cycloaliphatically bound isocyanate groups are preferred for the production of light-stable coatings.

The polyisocyanates are prepared by the known modification of simple organic diisocyanates, typically resulting in the formation of biuret, uretidione, isocyanurate, urethane or allophanate groups, or the simultaneous formation of various of these groups. Any excess of unmodified monomeric starting diisocyanate still present after the modification reaction is suitably removed in a known manner, such as distillation preferably using wiped-film evaporation, to provide a polyisocyanate that is essentially free of volatile diisocyanate. The term "essentially free of volatile diisocyanate" as used herein is intended to designate that the polyisocyanate contains no greater than 0.7%, preferably no greater than 0.5%, most preferably no greater than 0.2%, by weight of volatile diisocyanate based upon the weight of the polyisocyanate.

Diisocyanates suitable for use in the preparation of the polyisocyanates include, for example, 2,4- and/or 2,6 diisocyanatotoluene, 4,4'-diisocyanatodicyclohexylmethane, hexamethylene diisocyanate ("HDI"), 1-isocyanato-3,3,5-trimethyl-5-isocyanatomethyl-cyclohexane ("IPDI"), 1,4-butanediisocyanate, 1-methyl-2,4-diisocyanatocyclohexane, 1-methyl-2,6-diisocyanatocyclohexane, 4,4'-methylene-bis-(cyclohexyl isocyanate), 2-methyl-1,5-diisocyanatopentane, 2-ethyl-1,4-diisocyanatobutane, 2,4,4-trimethylhexamethylene-1,6-diisocyanate, a,a'-diisocyanato-1,3-dimethylbenzene, a,a'-diisocyanato-1,3-dimethylcyclohexane, a,a'-diisocyanato-1,4-dimethylbenzene, a,a'-diisocyanato-1,4-dimethylcyclohexane, 1,3-diisocyanatocyclohexane, 1,4-diisocyanatocyclohexane wherein "a" denotes "alpha". The polyisocyanates may also be suitably prepared from mixtures of these, or other, polyisocyanates, and mixtures of a polyisocyanate with a non-volatile isocyanate, such as octadecyl-isocyanate, are also suitable for use within the scope of the present invention. Preferably, aliphatic or cycloaliphatic diisocyanates are utilized as starting materials for preparing the polyisocyanates. HDI and IPDI are the most preferred starting materials for the preparation of polyisocyanates. Thus, most preferred polyisocyanates include tris-(isocyanatohexyl)-biuret, tris-(isocyanatohexyl)-isocyanurate, cyclodimerized HDI and mixtures thereof, as well as mixtures of these oligomeric polyisocyanates with their higher homologues. Trimerized HDI is available under the trademark of LUXATE, a product of Olin Corporation, as well as under the trademark Desmodur N-3300, a product of Miles Inc.

Suitable catalysts for use in the process of the present invention which promote the water-isocyanate reaction include hydroxyl-free tertiary amine catalysts, as well as hydroxyl-containing tertiary amine catalysts. Suitable tertiary amine catalysts include the following: bis(N,N'-dimethylaminoethyl)ether, tris(dimethylaminopropyl)amine, N,N'-dimethylpiperazine, pentamethyl dipropylene triamine.

Preferred catalysts are hydroxyl-containing tertiary amines, including N,N'-dimethylethanolamine, N,N-dimethylamino-ethoxyethanol, N,N'-dimethylaminoethyl-N-methylethanolamine, N,N-dimethyl-N',N'-2-hydroxypropyl- 1,3-propylene diamine, N,N,N'-trimethyl-N'-hydroxyethylbis(amino ethyl) ether, N,N-bis(3-dimethylaminopropyl) amino-2-propanol. The catalyst is suitably employed in an amount of between about 0.1% and about 5%, based upon the weight of the coating composition. Optionally, additional catalysts which promote polymer-forming reactions with the polyisocyanates, particularly reactions of the isocyanate with alcohol are suitably uses, and the use of these additional catalyst(s) is preferred. Such additional catalysts, for example dibutyltin dilaurate, and stannous octoate, are suitably employed in an amount of between about 0.01% and about 5%, preferably between about 0.01% and about 1%, by weight based upon the weight of the coating composition.

The isocyanate-reactive compound useful in the process of the present invention is an active hydrogen-containing compound, or a compound that reacts to generate an active hydrogen-containing moiety such as imines. The isocyanate-reactive compound is suitably selected from the group consisting of monoahls, polyols, imines (such as ketimines and aldimines), oxazolidines, and combinations thereof, preferably having a weight average molecular weight of between about 50 and about 10,000, more preferably between about 100 and about 5,000, most preferably between about 200 and about 2,000.

The term "monoahl" is intended to designate compounds having only one active hydrogen group. An active hydrogen group is a group which has at least one hydrogen atom which, because of its position in the molecule, displays activity according to the Zerewitnoff test described by Woller in the Journal of American Chemical Society, Vol. 49, page 3181 (1927). Illustrative of such active hydrogen groups are —OH, —NH—, —COOH, —SH and —CONH—. Typical monoahls suitable for this invention include monoalcohols, monoamines, thiols, carboxylic acids, amides and imines.

Suitable monoalcohols are the aliphatic or cycloaliphatic alcohols, optionally containing ester or ether linkages. Preferred monoahls are monohydric polyethers and monohydric polyesters. Monohydric polyethers are prepared by the polymerization of alkylene oxides with alcohols. Alcohols which may be employed in the polymerization include C1–C30 (cyclo)aliphatic straight- or branched-chain alcohols, such as methanol, ethanol, propanol, isopropanol, butanol, hexanol, cyclohexanol, and the like, and mixtures thereof. Illustrative alkylene oxides used in the polymerization include ethylene oxide, propylene oxide, butylene oxide, and the like. Monohydric polyesters are most readily prepared by the polymerization of lactones such as butyrolactone, valerolactone, caprolactone, and the like with alcohols. Suitable alcohols include the alcohols described above for polymerization with alkylene oxides.

Suitable amines are aliphatic or cycloaliphatic, primary or secondary amines. Preferred amines are poly(alkyleneoxy)alkylamines.

Polyols suitable for the present invention include polyether polyols and polyester polyols. The polyether polyols are prepared by polymerization of alkylene oxides with water, polyhydric alcohols with two to eight hydroxyl groups, or amines. Polyester polyols include the condensation products of polycarboxylic acids with polyhydric alcohols.

The isocyanate-reactive compound is employed in an amount sufficient to provide a ratio of NCO equivalents in the polyisocyanate to the active hydrogen equivalents in the isocyanate-reactive compound that is preferably between about 2:1 and about 10,000:1, more preferably between about 3:1 and about 2,000:1, most preferably between about 5:1 and about 2,000:1.

The coating compositions employed in the process of the present invention suitably contain small quantities of isocyanate-inert solvents in amounts of between 0% and 45% by weight, based upon the weight of the coating composition. It is preferred to minimize the amount of solvent utilized in the coating compositions of the present invention in order to minimize the VOC of the coating composition itself. However, some amount of solvent may be required in order to provide a desired low viscosity for the coating composition of less than about 200 seconds as measured by Zahn cup #2. Suitable solvents include toluene, xylene, butyl acetate, methyl ethyl ketone, methyl isobutyl ketone, methylamyl ketone, ethylethoxy propionate, ethoxyethylacetate, an aromatic hydrocarbon mixture having a boiling point of 152°–174° C., combinations thereof, and the like. Other optional additives are suitably employed, if desired, such as, for example, uv stabilizers; leveling agents; flow-aids; pigments, such as titanium dioxide; plasticizers; and/or other resins.

The coating compositions made in accordance with the process of the present invention are suitable for use in the production of clear or pigmented coatings, and may be applied to a desired substrate by conventional methods, such as spread coating, roller application or spraying. Because of the low viscosity of the compositions of the present invention, they are especially suitable for application by conventional spray techniques. The coating thickness on the substrate can vary over a wide range, although a dry film coating thickness of between about 0.01 and 0.5 millimeters is preferred.

Substrates for the coating useful in the present invention are suitably selected from a wide range of materials such as other plastics, such as polyethylene or polystyrene, wood and paper substrates, and metal substrates, such as sheet steel or aluminum.

The coating compositions of the present invention are stable in storage when atmospheric moisture is excluded and they are suitably cured under the influence of moisture over a broad range of temperatures to form coatings. The moisture necessary for the reaction may be available as atmospheric moisture, although moisture may be supplied artificially, such as by steam in continuous plant processing or as a separate moisture additive in very dry climates where little atmospheric moisture is present. Hardening or curing of the coatings obtained from the use according to the invention is preferably carried out at room temperature with dry times of between about 30 minutes to about eight hours, but it may also be conducted at elevated temperatures. For example, temperatures in excess of 100° C., or even 150° C., may be utilized to obtain typical dry times of less than one hour.

The coatings of the present invention are suitable for use in the production of automotive clear coatings or undercoats, floor covering coatings, wall coatings, transportation coatings, maintenance coatings, and the like, or any other application where a low VOC coating composition is desired for use on a substrate.

The following examples are intended to illustrate, but in no way limit the scope of, the present invention.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

EXAMPLES

The following products were utilized in the examples given hereinbelow:

Monoahl A is 2,2,4-trimethyl-1,3-pentanediol monoisobutyrate.

Monoahl B is a mixture of ethoxylated/propoxylated C6–C10 alcohols having an average molecular weight of about 530.

Monoahl C is a mixture of ethoxylated/propoxylated C6–C10 alcohols having an average molecular weight of about 1280.

Monoahl D is a mixture of ethoxylated/propoxylated C6–C10 alcohols having an average molecular weight of about 1680.

Monoahl E is a mixture of ethoxylated/propoxylated C6–C10 alcohols having an average molecular weight of about 640.

Monoahl F is a mixture of ethoxylated/propoxylated C6–C10 alcohols having an average molecular weight of about 810.

Polyol A is a poly(1,4-butanediol neopentyl glycol adipate) with an average molecular weight of about 800 and a hydroxyl number of 150 mg KOH/g.

Polyol B is a poly(1,6-hexanediol neopentyl glycol adipate) with an average molecular weight of about 500 and a hydroxyl number of 220 mg KOH/g.

Diimine A is a double Schiff base of isophorone diamine sold under the tradename Vestamine A139, a product of HYls.

Reactive Modifier A is a 2-isopropyl oxazolidine ester sold under the tradename QM-1007M, a product of Rohm and Haas.

Polyisocyanate A is a trimerized hexamethylene diisocyanate.

Polyisocyanate B is a mixture of tris(isocyanatohexyl)-isocyanurate and bis-(isocyanatohexyl)-uretidione prepared by phosphine-catalyzed oligomerization of hexamethylene diisocyanate followed by removal of excess hexamethylene diisocyanate by distillation. Isocyanate content=22.9% by weight, hexamethylene diisocyanate content=0.10% by weight, viscosity about 65 cps at 25° C.

Polyisocyanate C is a biuret polyisocyanate mixture prepared by the biuretization of hexamethylene diisocyanate followed by removal of excess hexamethylene diisocyanate by distillation. The biuret polyisocyanate mixture is then diluted to 75% by weight by adding 12.5% by weight of xylene and 12.5% by weight of butyl acetate. Isocyanate content=16.5% by weight, viscosity of 600 cps at 25° C.

Polyisocyanate D is a trimerized 1-isocyanato-3, 3,5-trimethyl-5-isocyanatomethyl-cyclohexane sold under the trademark of Desmodur Z4370 by Miles Inc.

Polyisocyanate E is a biuret polyisocyanate mixture prepared by the biuretization of hexamethylene diisocyanate followed by removal of excess hexamethylene diisocyanate by distillation. Isocyanate content=23% by weight, viscosity of 3000 cps at 25° C.

Catalyst A is 2-((2-(2-(dimethylamino)ethoxy)ethyl)methylamino)ethanol and sold under the trademark Texacat ZF-10, a product of Texaco.

Catalyst B is an alkanol amine sold under the tradename of Dabco T by Air Products.

Catalyst C is a 5% solution of dibutyltin dilaurate in toluene.

Catalyst D is bis(dimethylaminoethyl) ether.

Flow-aid A is an acrylic flow and leveling agent sold as a 60% solids solution in xylene under the trademark Coroc A-620-A2, a product of Freeman Polymers.

Flow-aid B is an acrylic flow and leveling agent sold under the tradename of Modaflow Resin by Monsanto.

Example 1

A 16 oz., wide-mouth bottle was charged with 15 g of ethylethoxypropionate (EEP), 15 g of butyl acetate (BA), 1.5 g of Catalyst B, 0.4 g of Flow Aid A, 8.36 g of Monoahl A, and 83 g of Polyisocyanate A. The resulting mixture was stirred with a spatula to produce the coating composition as a clear, homogenous solution. The coating composition had a viscosity of 24 seconds as measured by Zahn cup No. 2. The coating composition contained 24.3% solvent by weight.

Examples 2–15

Using the procedure described in Example 1 the following coating compositions were prepared.

TABLE 1

| EXAMPLE | POLYISOCYANATE TYPE | POLYISOCYANATE AMOUNT (g) | MONOAHL TYPE | MONOAHL AMOUNT (g) | CATALYST A AMOUNT (g) | CATALYST B AMOUNT (g) |
|---|---|---|---|---|---|---|
| 2 | A | 90 | B | 10 | 1.5 | 0 |
| 3 | A | 70 | B | 30 | 1.5 | 0 |
| 4 | A | 60 | B | 40 | 1.5 | 0 |
| 5 | A | 41.5 | A | 4.18 | 0.75 | 0 |
| 6 | A | 80 | B | 20 | 1.5 | 0 |
| 7 | B | 80 | B | 20 | 1.5 | 0 |
| 8 | C | 53.5 | B | 10 | 0.75 | 0 |
| 9 | D | 44 | B | 10 | 0.75 | 0 |
| 10 | A | 83 | A | 8.36 | 0 | 1.5 |
| 11 | A | 80 | B | 21 | 0 | 1.5 |
| 12 | A | 57.86 | C | 43.45 | 1.5 | 0 |
| 13 | A | 31.14 | D | 18.89 | 0.75 | 0 |
| 14 | A | 76.21 | E | 23.79 | 1.5 | 0 |
| 15 | A | 71.02 | F | 28.97 | 1.5 | 0 |

| EXAMPLE | CATALYST C AMOUNT (g) | BA AMOUNT (g) | EEP AMOUNT (g) | FLOW-AID A AMOUNT (g) | VISCOSITY ZAHN #2 (sec) | SOLVENT WEIGHT % |
|---|---|---|---|---|---|---|
| 2 | 0.2 | 7.5 | 7.5 | 0.4 | NT * | 12.8% |
| 3 | 0.2 | 7.5 | 7.5 | 0.4 | 24 | 12.8% |
| 4 | 0.2 | 7.5 | 7.5 | 0.4 | NT * | 12.8% |
| 5 | 0 | 7.5 | 7.5 | 0.4 | 24 | 24.3% |
| 6 | 0.2 | 15 | 15 | 0.4 | 20 | 22.7% |
| 7 | 0.2 | 10 | 10 | 0.4 | 24 | 16.4% |
| 8 | 0.1 | 5 | 5 | 0.2 | NT * | 13.4% |
| 9 | 0 | 5 | 5 | 0.4 | 24 | 15.3% |
| 10 | 0 | 15 | 15 | 0.4 | 24 | 24.3% |
| 11 | 0 | 10 | 10 | 0.5 | 37 | 16.3% |
| 12 | 0.2 | 17.5 | 17.5 | 0.4 | 29 | 25.3% |
| 13 | 0.1 | 7.5 | 7.5 | 0.2 | 24 | 22.7% |
| 14 | 0.2 | 15 | 15 | 0.4 | 24 | 22.7% |
| 15 | 0.2 | 15 | 15 | 0.4 | 23 | 22.7% |

* "NT" denoted "not tested".

Example 16

A 16-oz, wide-mouth bottle was charged with 5 g of ethylethoxypropionate, 5 g of butyl acetate, 5 g of methylamyl ketone, 0.75 g of Catalyst A, 0.1 g of Catalyst C, 0.2 g of Flow-aid B, 12 g of Monoahl B, and 40 g of Polyisocyanate E. The resulting mixture was stirred with a spatula to produce the coating composition as a clear, homogeneous solution. The coating composition contained 22.0% solvent by weight.

Example 17

A 16-oz, wide-mouth bottle was charged with 15 g of ethylethoxypropionate, 0.75 g of Catalyst D, 0.1 g of Catalyst C, 0.2 g of Flow-aid A, 10 g of Monoahl B, and 40 g of Polyisocyanate A. The resulting mixture was stirred with a spatula to produce the coating composition as a clear, homogeneous solution. The coating composition contained 22.7% solvent by weight.

Example 18

A 16-oz, wide-mouth bottle was charged with 15 g of ethylethoxypropionate, 15 g of butyl acetate, 1.5 g of Catalyst B, 0.7 g of Flow-aid A, 20 g of Polyol A, and 80 g of Polyisocyanate A. The resulting mixture was stirred with a spatula to produce the coating composition as a clear, homogeneous solution. The coating composition had a viscosity of 40 sec as measured by Zahn cup #2. The coating composition contained 22.7% solvent by weight.

Example 19

A 16-oz, wide-mouth bottle was charged with 21 g of ethylethoxypropionate, 21 g of butyl acetate, 1.5 g of Catalyst B, 0.7 g of Flow-aid A, 20 g of Polyol B, and 81 g of Polyisocyanate A. The resulting mixture was stirred with a spatula to produce the coating composition as a clear, homogeneous solution. The coating composition had a viscosity of 19 sec as measured by Zahn cup #2. The coating composition contained 28.9% solvent by weight.

Example 20

A 16-oz., wide-mouth bottle was charged with 40 g of ethylethoxypropionate, 1.5 g of Catalyst A, 0.2 g of Catalyst C, 1.0 g of Flow-aid B, 80 g of Polyisocyanate A and 20 g of Diimine A. The resulting mixture was stirred with a spatula to produce the coating composition as a clear, homogeneous solution. The coating composition contained 28.0% solvent by weight.

Example 21

A 16-oz., wide-mouth bottle was charged with 10 g of ethylethoxypropionate, 10 g of butyl acetate, 0.96 g of catalyst B, 80 g of Polyisocyanate A and 20 g of Reactive Modifier A. The resulting mixture was stirred with a spatula to produce the coating composition as a clear, homogeneous solution. The coating composition contained 16.5% solvent by weight.

Examples 22–42

The coating compositions prepared in Examples 1–19 were sprayed at 45 psi using a conventional spray gun (model #DH6500 from Binks Mfg. Co.) on cold-rolled steel panels. A small portion of the coating composition was used to coat a glass strip which was placed in a BK Drying Recorder (Paul N. Gardner Company, Inc.) to determine the drying time. The recorder uses a tracking needle to determine the solvent evaporation time, the gel time, and the surface-dry time. The drying time determinations were made at 20° C. and 50% relative humidity.

The coated test panels were allowed to cure at ambient temperature and humidity conditions for two weeks before testing for appearance, mechanical properties, and chemical resistance. Pencil hardness was determined according to ASTM D3363-92a. The conical mandrel bend tests were performed using a one-eighth inch tester from BYK-Gardner, Inc. according to ASTM D522-92. Direct and reverse impact values were determined according to ASTM D2794-92 using a variable height impact tester from BYK-Gardner, Inc. Gloss was determined using a micro-TRZ-gloss, multiangle glossmeter from BYK-Gardner, Inc. Cross-hatch adhesion was determined using a cross-hatch cutter from BYK-Gardner according to ASTM D3359-92a. Chemical resistance was determined according to ASTM D1308-87. The results are presented in Table 2 below. Although most of the coatings properties show in the table are acceptable for a wide variety of applications, those showing a poor result in one or two properties would be suitably utilized in applications not requiring those properties.

TABLE 2

| EXAMPLE | COATING COMPOSITION | SOLVENT EVAPORATION (min) | GEL TIME (min) | SURFACE DRY (min) | THICKNESS (mils) | PENCIL HARDNESS | MANDREL BEND | DIRECT IMPACT (in/lb) |
|---|---|---|---|---|---|---|---|---|
| 22 | Example 1 | 30 | 75 | 240 | 2 | NT* | PASS | 160 |
| 23 | Example 2 | 15 | 30 | 60 | 1.4 | 5 | PASS | 90 |
| 24 | Example 3 | 15 | 30 | 60 | 1.8 | 4 | PASS | 160 |
| 25 | Example 4 | 15 | 20 | 80 | 1.4 | 3 | PASS | 160 |
| 26 | Example 5 | 15 | 45 | 105 | 2 | 3 | PASS | 80 |
| 27 | Example 6 | 10 | 20 | 45 | 1.7 | 4 | PASS | 160 |
| 28 | Example 7 | 10 | 20 | 90 | 2.6 | 4 | PASS | 160 |
| 29 | Example 8 | 5 | 15 | 45 | 2.8 | 3 | PASS | 100 |
| 30 | Example 9 | 15 | 30 | 105 | 3.1 | 4 | FAIL | 10 |
| 31 | Example 10 | 30 | 75 | 240 | 2 | 4 | PASS | 160 |
| 32 | Example 11 | 30 | 150 | 315 | 1.8 | 4 | PASS | 160 |
| 33 | Example 12 | 60 | 120 | 150 | 1.8 | 1 | PASS | 160 |
| 34 | Example 13 | 90 | 120 | 180 | 2.1 | 1 | PASS | 160 |
| 35 | Example 14 | 90 | 120 | 180 | 2.1 | 4 | PASS | 160 |
| 36 | Example 15 | 15 | 45 | 120 | 2 | 3 | PASS | 160 |
| 37 | Example 16 | 15 | 40 | 100 | 2 | 4 | PASS | 160 |
| 38 | Example 17 | 15 | 30 | 75 | 1.2 | 4 | PASS | 160 |
| 39 | Example 18 | 60 | 120 | 240 | 2.5 | 4 | PASS | 160 |
| 40 | Example 19 | 90 | 150 | 270 | 3 | 4 | PASS | 155 |

TABLE 2-continued

| | | | | | | | | |
|---|---|---|---|---|---|---|---|---|
| 41 | Example 20 | 15 | 45 | 70 | 2 | 4 | PASS | 160 |
| 42 | Example 21 | 21 | 45 | 90 | 195 | NT* | PASS | 160 |

| EXAMPLE | REVERSE IMPACT (in/lb) | GLOSS (60°) | GLOSS (20°) | CROSSHATCH ADHESION | CHEMICAL RESISTANCE NaOH (10%) | HCl (10%) | CH3COOH (10%) | MEK RUB | XYLENE RUB |
|---|---|---|---|---|---|---|---|---|---|
| 22 | 160 | 98% | NT* | PASS | PASS | PASS | PASS | PASS | PASS |
| 23 | 120 | 104% | 91% | PASS | PASS | PASS | PASS | PASS | PASS |
| 24 | 160 | 109% | 95% | PASS | PASS | PASS | PASS | PASS | PASS |
| 25 | 160 | 105% | 92% | PASS | PASS | FAIL | FAIL | PASS | PASS |
| 26 | 4 | 100% | 80% | PASS | PASS | PASS | PASS | PASS | PASS |
| 27 | 160 | 104% | NT* | PASS | PASS | PASS | PASS | PASS | PASS |
| 28 | 160 | 2% | 6% | PASS | PASS | PASS | PASS | PASS | PASS |
| 29 | 20 | 31% | 8% | PASS | PASS | PASS | PASS | PASS | PASS |
| 30 | 5 | 104% | 90% | PASS | PASS | PASS | PASS | PASS | PASS |
| 31 | 160 | 98% | NT* | PASS | PASS | PASS | PASS | PASS | PASS |
| 32 | 160 | 108% | NT* | PASS | PASS | PASS | PASS | PASS | PASS |
| 33 | 60 | NT* | 90% | PASS | FAIL | FAIL | FAIL | FAIL | PASS |
| 34 | 160 | 105% | 91% | PASS | PASS | FAIL | FAIL | PASS | PASS |
| 35 | 160 | 90% | NT* | PASS | PASS | PASS | PASS | PASS | PASS |
| 36 | 160 | 94% | 64% | PASS | PASS | PASS | PASS | FAIL | PASS |
| 37 | 160 | 103% | 92% | PASS | PASS | PASS | PASS | PASS | PASS |
| 38 | 160 | 105% | 89% | PASS | PASS | PASS | PASS | PASS | PASS |
| 39 | 160 | 105% | NT* | PASS | PASS | PASS | PASS | PASS | PASS |
| 40 | 155 | 110% | NT* | PASS | PASS | PASS | PASS | PASS | PASS |
| 41 | 160 | 102% | 84% | PASS | PASS | PASS | FAIL | PASS | PASS |
| 42 | 160 | 103% | NT* | | | | | | |

*"NT" denotes "not teste".

What is claimed is:

1. A process for coating a substrate comprising contacting the substrate with a low volatile organics, moisture curable, two-component coating composition comprising an admixture of an A-side and a B-side, said A-side comprising a polyisocyanate selected from the group consisting of aliphatic polyisocyanates, cycloaliphatic polyisocynates, and combinations thereof, and containing at least one moiety selected from the group consisting of biuret, isocyanurate, uretidione, urethane, and allophanate moieties, and combinations thereof, and having an isocyanate index relative to the number of isocyanate-reactive groups in said coating composition of at least about 200, said B-side comprising a tertiary amine catalyst and an isocyanate-reactive compound selected from the group consisting of monoahls, said coating composition containing a solvent in an amount of between 0% and 45%, based upon the weight of the polyisocyanate in said coating composition, said coating composition having a viscosity as measured by ZAHN cup 2 of less than about 200 seconds, said composition being essentially free of any volatile mono- and di-isocyanates, and said composition being moisture curable upon exposure to atmospheric moisture.

2. The process of claim 1 wherein said coating composition is solvent-free.

3. The process of claim 1 wherein said solvent is selected from the group consisting of toluene, xylene, butyl acetate, methyl ethyl ketone, methyl isobutyl ketone, methylamyl ketone, ethoxyethylacetate, ethylethoxy propionate, an aromatic hydrocarbon mixture having a boiling point of 152°–174° C. and combinations thereof.

4. The process of claim 1 wherein said polyisocyanate has an average functionality of at least 2.

5. The process of claim 4 wherein said average functionality is between 2.5 and 6.

6. The process of claim 1 wherein said polyisocyanate is an aliphatic polyisocyanate prepared from hexamethylene diisocyanate.

7. The process of claim 1 wherein said polyisocyanate is selected from the group consisting of tris-(isocyanatohexyl)-biuret, tris-(isocyanatohexyl)isocyanurate, cyclodimerized hexamethylene diisocyanate and combinations thereof.

8. A low volatile organics, moisture curable, two-component coating composition comprising an admixture of an A-side and a B-side, said A-side comprising a polyisocyanate selected from the group consisting of aliphatic polyisocyanates, cycloaliphatic polyisocynates, and combinations thereof, and containing at least one moiety selected from the group consisting of biuret, isocyanurate, uretidione, urethane, and allophanate moieties, and combinations thereof, and having an isocyanate index relative to the number of isocyanate-reactive groups in said coating composition of at least about 200, said B-side comprising a tertiary amine catalyst and an isocyanate-reactive compound selected from the group consisting of monoahls, said coating composition containing a solvent in an amount of between 0% and 45%, based upon the weight of the polyisocyanate in said coating composition, said coating composition having a viscosity as measured by ZAHN cup 2 of less than about 200 seconds, said composition being essentially free of any volatile mono- and di-isocyanates, and said composition being moisture curable upon exposure to atmospheric moisture.

9. The composition of claim 8 which is solvent-free.

10. The composition of claim 8 wherein said solvent is selected from the group consisting of toluene, xylene, butyl acetate, methyl ethyl ketone, methyl isobutyl ketone, methylamyl kethone, ethoxyethylacetate, ethylethoxy propionate, an aromatic hydrocarbon mixture having a boiling point of 152°–174° C. and combinations thereof.

11. The composition of claim 8 wherein said polyisocyanate has an average functionality of at least 2.

12. The composition of claim 11 wherein said average functionality is between 2.5 and 6.

13. The composition of claim 8 wherein said polyisocyanate is an aliphatic diisocyanate prepared from hexamethylene diisocyanate.

14. The composition of claim 8 wherein said polyisocyanate is selected from the group consisting of tris-(isocyanatohexyl)-biuret, tris-(isocyanatohexyl)isocyanurate, cyclodimerized hexamethylene diisocyanate and combinations thereof.

15. The composition of claim 8 wherein said catalyst is a tertiary amine catalyst selected from the group consisting of N,N'-dimethylethanolamine, N,N-dimethylamino-ethoxyethanol, N,N'-dimethylaminoethyl-N-methylethanolamine, N,N-dimethyl-N',N'-2-hydroxypropyl- 1,3-propylenediamine, N,N,N'-trimethyl-N'-hydroxyethylbis(amino ethyl) ether, N,N-bis(3-dimethylaminopropyl) amino-2-propanol, and combinations thereof.

16. The composition of claim 8 wherein said catalyst is employed in an amount of between about 0.1% and about 5%, based upon the weight of the coating composition.

* * * * *